T. K. LOWRY.
METHOD AND MEANS FOR DEHAIRING.
APPLICATION FILED MAY 27, 1916.
1,254,248.
Patented Jan. 22, 1918.
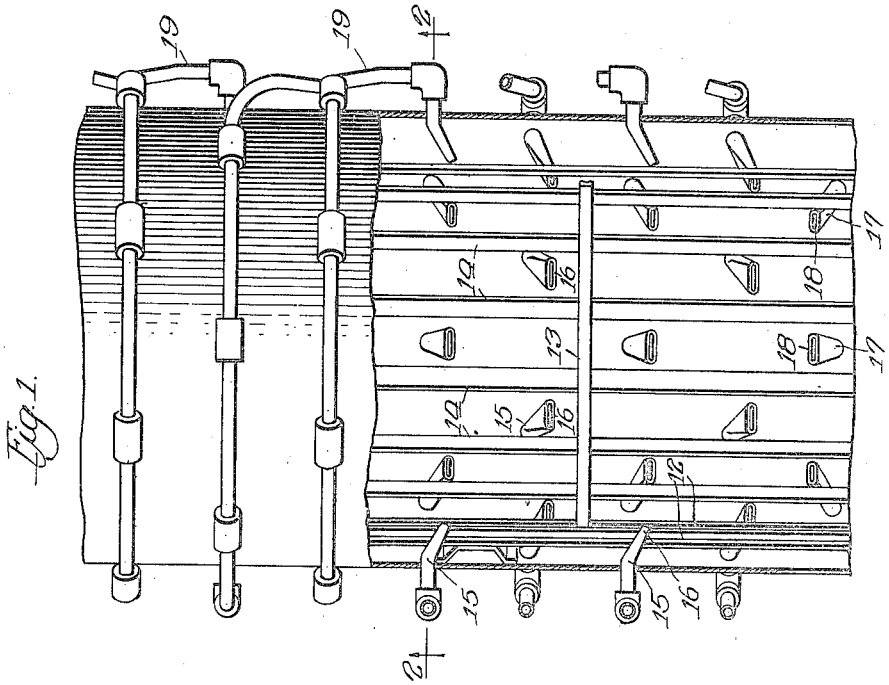
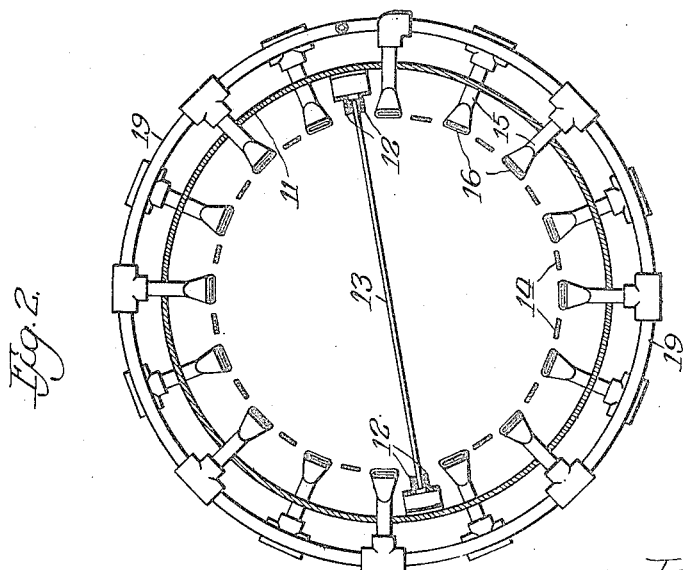
Witnesses:
Inventor
Thomas K. Lowry.

UNITED STATES PATENT OFFICE.

THOMAS K. LOWRY, OF CHICAGO, ILLINOIS.

METHOD AND MEANS FOR DEHAIRING.

1,254,248. Specification of Letters Patent. Patented Jan. 22, 1918.

Application filed May 27, 1916. Serial No. 100,211.

*To all whom it may concern:*

Be it known that I, THOMAS K. LOWRY, a citizen of the United States, residing at Chicago, in the county of Cook and State of Illinois, have invented certain new and useful Improvements in Methods and Means for Dehairing, of which the following is a specification.

The invention has for its object the provision of an efficient and economical method for removing the hair from the carcasses of animals such as hogs, cattle and the like, either before or after removal of the hide, and is particularly adapted to the dehairing of hogs in preparing them for the market.

Heretofore it has been customary to subject the carcasses of hogs to the action of beaters or scrapers which act mechanically to remove the hair loosened by preliminary scalding. Not only are such methods and devices expensive to install and to operate but the carcass is liable to be bruised or cut with consequent injury to the meat. By the present invention the removal of the hair is expeditiously effected without danger of injury and the necessary devices are inexpensive from the standpoints both of installation and maintenance.

In order that the invention may be readily understood by those skilled in the art, one embodiment of the same is set forth in the accompanying drawing and in the following detailed description based thereon. The invention is illustrated and described in connection with the de-hairing of hogs, but it is obvious, as before stated, that it is equally applicable to the de-hairing of other animals; also that the form of device illustrated and described by way of example is susceptible of modification within a wide range to suit varying requirements of service. In the drawing—.

Figure 1 is a plan view partly in elevation and partly in longitudinal section of one form of chute adapted to the carrying out of the invention; and Fig. 2 is a cross sectional view on the line 2—2 of Fig. 1.

Referring to the drawings, at 11 is shown a chute in the form of an elongated drum or cylinder through which the carcasses of the animals are transported by means of chain 12, provided with transverse suspending bars 13, although other means of transportation may be utilized. The interior of the drum is shown as provided with a plurality of longitudinally extending fenders or guides 14 which serve the purpose of holding the carcass away from the sides of the drum. Into the drum project a series of nozzles 15 having flattened discharge orifices 16, arranged at an inclination to the path of travel of the carcass through the drum, the direction of inclination being such that the jets from said nozzles will be applied to the surface of the carcass opposite the lay of the hair. Other nozzles 17 are likewise employed with discharge orifices 18 directed at a different inclination for applying the jets to the surface of the carcass beneath the joints, in the ears, and at other points not readily reached by the nozzles 15. These several nozzles project into the drum to a point substantially flush with the inner surfaces of the fenders 14 and are protected from engaging the body of the animal by said fenders. It will be obvious that the fenders may be dispensed with and the nozzles may be arranged to terminate substantially flush with the inner surface of the drum, in which case there would be no danger of engagement of the nozzle by the carcass.

The several nozzles 16 and 17 are arranged to be supplied from the header indicated at 19 with water under a high pressure and preferably from 150 to 250 pounds to the square inch, said water having a temperature in excess of 120°.

It will be obvious that the chute 11 may be arranged in a vertical, inclined, or horizontal position; that various appropriate forms of devices for transporting the animal therethrough may be adopted, such as belts, revolving drums, screws, and elevating chains; that the animal may be transported without turning, dependence being placed upon the large number of nozzles in staggered relation or a single continuous suitably shaped nozzle to reach all parts of the carcass, or a small number of nozzles may be used and the carcass itself may be revolved so as to bring all parts of the body under the influence of the jet or jets; all without departure from the invention herein described and claimed, the essential characteristic feature of the same being the subjection of the carcass or hide to the action of water under high pressure applied obliquely to the surface, preferably in a direction opposite to the lay of the hair, and advantageously at a temperature above normal, whereby the removal of the hair is facilitated and the skin is thoroughly cleaned, massaged and polished. In many cases it would be found advantageous to arrange above the water jets suitably disposed gas nozzles for directing onto the carcass jets of flame for singeing the same, all of which would be within the scope of my invention as hereinafter claimed.

I claim:

1. The method of de-hairing the hides of animals which consists in subjecting the same to the action of jets of fluid under pressure applied obliquely to the surface.

2. The method of de-hairing the hides of animals which consists in subjecting the same to the action of jets of fluid under pressure applied in a direction opposite the lay of the hair.

3. The method of de-hairing the hides of animals which consists in subjecting the same to the action of jets of water under pressure applied obliquely to the surface and in a direction opposite the lay of the hair.

4. The method of de-hairing the hides of animals which consists in subjecting the same to the action of jets of hot water under pressure.

5. The method of de-hairing the hides of animals which consists in subjecting the same to the action of jets of hot water under pressure applied obliquely to the surface and in a direction opposite the lay of the hair.

6. The method of de-hairing the hides of animals which consists in subjecting the same to the action of jets of water under pressure of 150 pounds and upward at a temperature of 120 degrees and upward.

7. The method of de-hairing the hides of animals which consists in subjecting the same to the action of jets of water under pressure of 150 pounds and upward at a temperature of 120 degrees and upward, said jets of water applied obliquely to the surface in a direction opposite the lay of the hair.

8. In an apparatus for de-hairing animals by pressure fluid impact, a nozzle adapted to direct a stream of fluid onto the surface of the carcass, means to supply the nozzle with water under pressure, and means to effect a relative movement of the animal and nozzle to bring different portions of the carcass under the action of the fluid.

9. In an apparatus for de-hairing animals by pressure fluid impact, a chute, means to convey the carcass through said chute, a nozzle adapted to direct a stream of water onto the surface of the carcass, and means to supply the said nozzle with water under high pressure.

10. In an apparatus for de-hairing animals by pressure fluid impact, a chute, means to convey the carcass through said chute, nozzles arranged at an inclination to the direction of travel of the carcass and adapted to direct streams of water onto the surface thereof, and means to supply the said nozzles with water under high pressure.

11. In an apparatus for de-hairing animals by pressure fluid impact, a chute, means to convey the carcass through said chute, nozzles arranged at an inclination to the direction of travel of the carcass and adapted to direct a stream of water onto the surface thereof, and means to supply the said nozzles with hot water under high pressure.

12. In an apparatus for de-hairing animals by pressure fluid impact, a chute, means to convey the carcass through said chute, flattened nozzles arranged in staggered relation at an inclination to the direction of travel of the carcass and adapted to direct a stream of water onto the surface thereof, and means to supply the said nozzles with hot water under high pressure.

13. In an apparatus for de-hairing animals by pressure fluid impact, a chute, means to convey the carcass through said chute, nozzles arranged at different inclinations to the direction of travel of the carcass and adapted to direct streams of water onto the surface thereof, and means to supply the said nozzles with water under high pressure.

14. The method of removing hair from hogs which consists of directing upon the carcass of the animal a jet of boiling water at sufficient velocity to remove the hair by the mechanical force of the water.

15. The method of removing hair from the hides of animals which consists of directing a plurality of jets of boiling water upon the hide of the animal at different angles and at such velocity that the mechanical force of the water detaches the hair from the hide.

16. The method of removing hair from the hides of animals which consists of discharging jets of boiling water simultaneously at different points upon the hide of the animal and at such velocity that the mechanical force of the water detaches the hair from the hide and moving the carcass relatively to said jets.

In witness whereof I have hereunto signed my name in the presence of two subscribing witnesses.

THOMAS K. LOWRY.

Witnesses:
 ABRAM B. STRATTON,
 THOMAS J. KEOGH.